United States Patent [19]

Merry et al.

[11] Patent Number: 4,621,926
[45] Date of Patent: Nov. 11, 1986

[54] INTERFEROMETER SYSTEM FOR CONTROLLING NON-RECTILINEAR MOVEMENT OF AN OBJECT

[75] Inventors: J. Bradford Merry; Lawrence B. Brown, both of Annapolis, Md.

[73] Assignee: Lasercon Corporation, Lanham, Md.

[21] Appl. No.: 729,106

[22] Filed: Apr. 30, 1985

[51] Int. Cl.⁴ .............................................. G01B 11/00
[52] U.S. Cl. ...................................... 356/363; 33/503
[58] Field of Search ................ 356/4.5, 345, 363, 356, 356/358; 33/125 R, 125 A, 125 W, 503; 250/550

Primary Examiner—Eugene R. LaRoche
Assistant Examiner—D. C. Mis
Attorney, Agent, or Firm—Roylance, Abrams, Berdo & Goodman

[57] ABSTRACT

A system for accurately controlling the movement of an object through a predetermined non-rectilinear path in a predetermined volume having X, Y and Z axes. The system uses three tracking laser interferometers rigidly positioned relative to the volume and a single retroreflector rigidly coupled to the object to control movement of the object non-rectilinearly through the volume along a predetermined path. Using two more tracking laser interferometers and an additional retroreflector rigidly coupled to the object, the system controls angular orientation of the object about one of the axes. Adding a sixth tracking laser interferometer and a third retroreflector to the object, the system can also control angular orientation about the other two axes. Each tracking laser interferometer comprises an interferometer and a tracking mirror which is pivoted to maintain the interferometer output beam on its associated retroreflector.

11 Claims, 7 Drawing Figures

INTERFEROMETER SYSTEM FOR CONTROLLING NON-RECTILINEAR MOVEMENT OF AN OBJECT

The Government has rights in this invention pursuant to Contract No. N00014-83-C-2226 awarded by the Department of Defense.

FIELD OF THE INVENTION

The invention relates to a system for accurately controlling the movement of an object through a predetermined non-rectilinear path in a predetermined volume having X, Y and Z axes. The system uses three tracking laser interferometers rigidly positioned relative to the volume and a single retroreflector rigidly coupled to the object to control non-rectilinear movement of the object along the X, Y and Z axes. Using two more tracking laser interferometers and an additional retroreflector, the system controls angular orientation of the object about one of the axes. Adding a sixth tracking laser interferometer and a third retroreflector, the system also controls angular orientation about the other two axes.

BACKGROUND OF THE INVENTION

Numerous devices utilizing electronic and optical systems are known for controlling the movement of an object through a predetermined path, the object being, for example, a robot arm, a cutting device or a machine tool. The basic problem with these prior art devices is that they have a limited tracking accuracy of about 1 part per 5,000, that is in a volume 10 feet by 10 feet by 20 feet, the accuracy is only about 0.05 inch.

Thus, these prior art control devices are unable to provide an extremely high degree of accuracy.

Examples of prior art devices relating to measuring the location of objects are disclosed in the following U.S. Pat. Nos. 3,471,239 to Woodson; 3,658,427 to DeCou; 3,790,284 to Baldwin; 4,261,107 to Coleman et al; 4,436,417 to Hutchin; and 4,457,625 to Greenleaf et al, the disclosures of which are hereby incorporated by reference.

SUMMARY OF THE INVENTION

Accordingly, a primary object of the invention is to provide an apparatus for controlling the movement of an object through a predetermined non-rectilinear path in a predetermined volume on a continuous basis and with high accuracy.

Another object of the invention is to provide such an apparatus as well as a method that can control the object to plus or minus 0.001 inch in a volume of 10 feet by 10 feet by 20 feet, i.e., 1 part in 250,000.

Another object of the invention is to provide such an apparatus and method that can control the movement of an object in a predetermined volume through a predetermined non-rectilinear path simultaneously along X, Y and Z axes as well as the angular orientation of the object about the pitch, roll and yaw axes.

The foregoing objects are basically attained by providing an apparatus for controlling the movement of an object through a predetermined non-rectilinear path in a predetermined volume having X, Y and Z axes, the combination comprising: a support, a first assembly, coupled to the support and the object, for moving the object simultaneously along the X, Y and Z axes; a retroreflector rigidly coupled to the object; a housing rigidly coupled to the support and in a fixed position relative to the predetermined volume; first, second and third laser interferometers rigidly coupled to the housing, and having first, second and third laser output beams, and first, second and third output signals; first, second and third tracking mirrors, each associated with one of the laser interferometers for directing the associated laser output beam incident on the center of the retroreflector; a second assembly for pivotally coupling each of the tracking mirrors to the housing for pivotal movement about two perpendicular axes; a motive assembly, coupled to each of the tracking mirrors and the housing, for moving each tracking mirror to maintain each of the output beams incident on the center of the retroreflector; and a control system, containing the X, Y and Z spacial coordinates of the predetermined path, coupled to the first assembly and the motive assembly and receiving the interferometer output signals, for (a) repeatedly determining the actual location of the object based on the interferometer output signals, (b) repeatedly comparing the actual location with the desired location along the predetermined path, (c) actuating the first assembly to move the object from its actual location to the next desired location along the predetermined path, and (d) actuating the motive assembly to pivot the tracking mirrors to maintain the laser output beams incident on the center of the retroreflector.

The foregoing objects are also basically attained by providing a method for controlling the movement of an object through a predetermined non-rectilinear path in a predetermined volume having X, Y and Z axes, comprising the steps of: storing the predetermined X, Y and Z spacial coordinates of the predetermined path, positioning the object in the predetermined volume with a retroreflector rigidly coupled thereto, directing three laser beams incident on the center of the retroreflector from three laser interferometers rigidly positioned relative to one another and to the predetermined volume, generating an output signal from the laser interferometers representing the actual location of the retroreflector and object, comparing the actual location of the retroreflector and object with the desired location along the predetermined path, moving the object from its actual location to the next desired location along the predetermined path, redirecting the three laser beams incident on the center of the retroreflector, and continuously repeating the generating, comparing, moving and redirecting steps until the object has traversed the entire predetermined path.

Other objects, advantages, and salient features of the present invention will become apparent from the following detailed description, which, taken in conjunction with the annexed drawings, disclosed preferred embodiments of the present invention.

DRAWINGS

Referring now to the drawings which form a part of this original disclosure:

Figure 4:
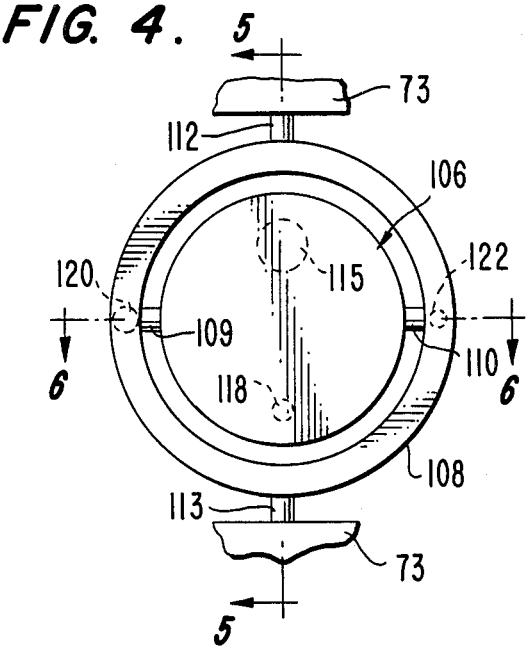
FIG. 4 is an enlarged front elevational view of one of the tracking mirrors showing its two-axis gimballed support on the tracking assembly housing.
Figure 6:
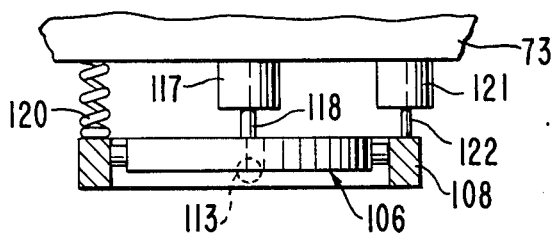
Figure 7:
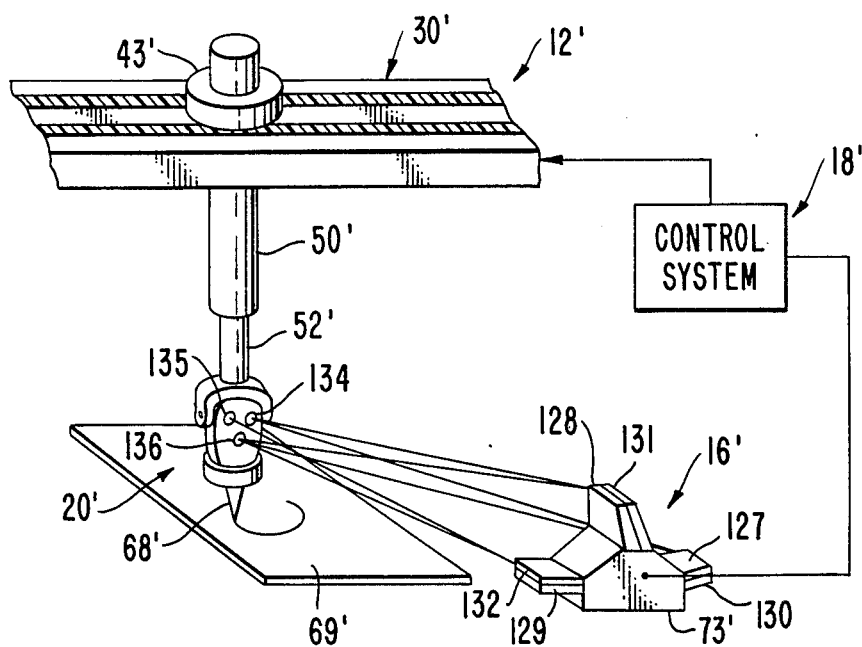

FIG. 6 is a top plan view in section taken along line 6—6 in FIG. 4 showing the second piezoelectric actuator for controlling the tracking mirror about the second gimbal axis; and FIG. 7 is a fragmentary diagrammatic view of a modified apparatus in accordance with the invention wherein the object has rigidly coupled thereto three retroreflectors for use in conjunction with six tracking laser interferometers.

DETAILED DESCRIPTION OF THE INVENTION

Figure 1:
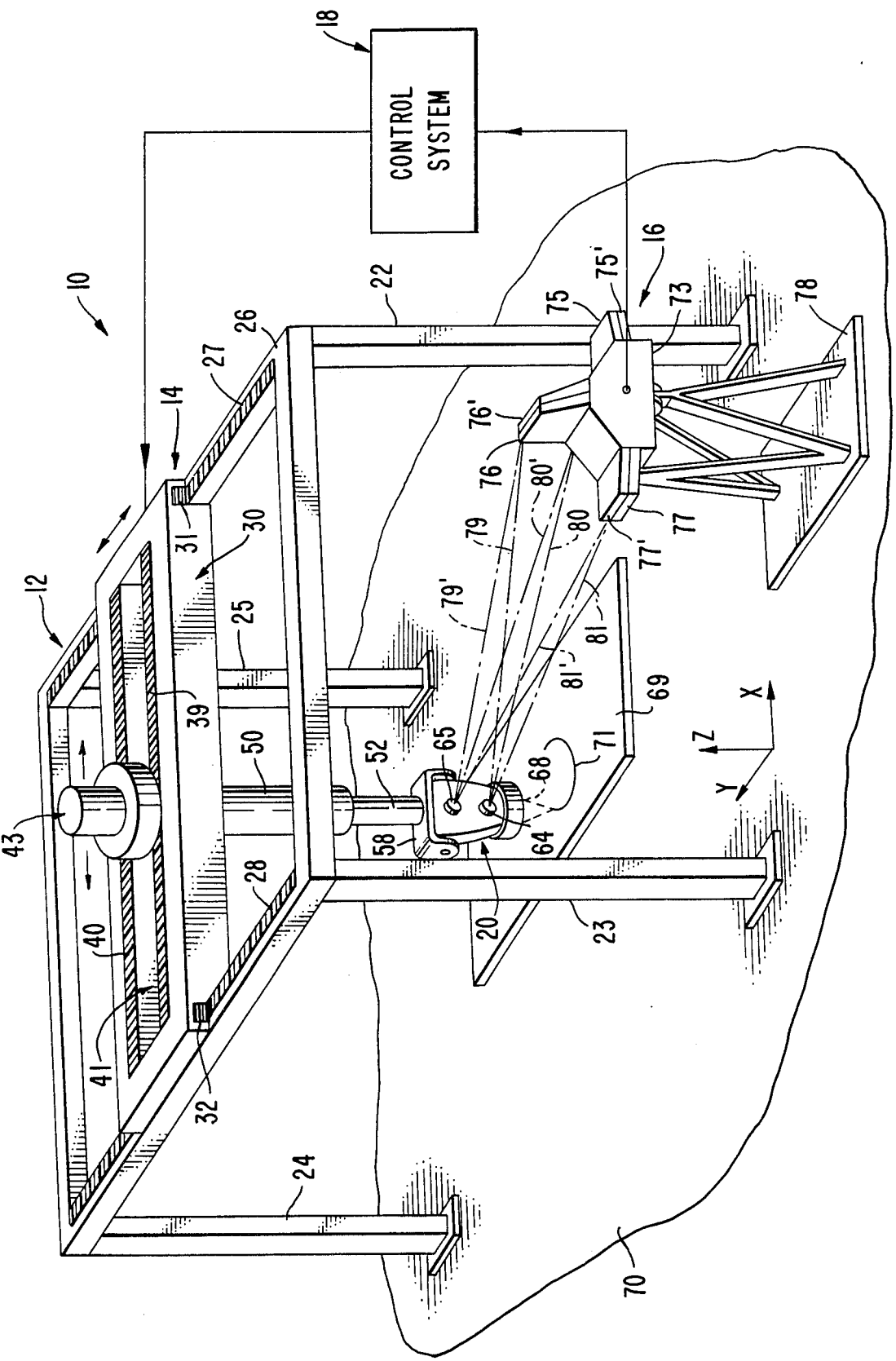
FIG. 1 is a perspective view of the apparatus in accordance with the present invention illustrating the support assembly, motive assembly, tracking assembly and control system, as well as the object itself, for controlling the movement of the object through a predetermined non-rectilinear path located in the predetermined volume defined by the support assembly.
Figure 2:
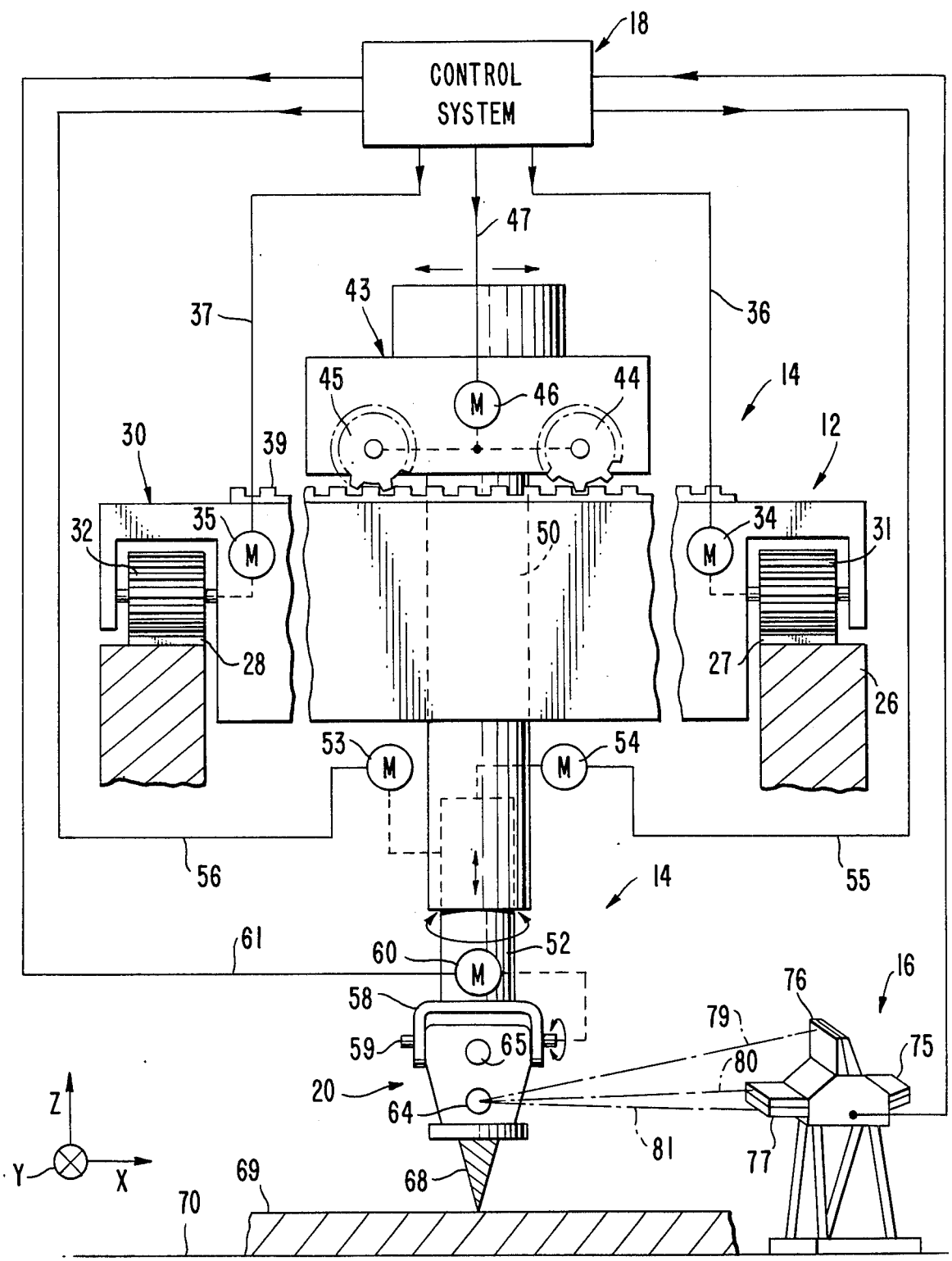
FIG. 2 is an enlarged diagrammatic representation of the various elements shown in FIG. 1 except that the motive assembly, including all of the individual motors, is shown in detail.

As seen in FIGS. 1 and 2, the overall control apparatus 10 in accordance with the invention basically comprises a support assembly 12, a motive assembly 14 comprising several motors, a tracking assembly 16 comprising at least three tracking laser interferometers, and a control system 18 basically including a digital computer, all for controlling the movement of a target object 20 through a predetermined non-rectilinear path in a predetermined volume having X, Y and Z axes as defined by the support assembly.

The support assembly 12 supports the object 20 for movement through the predetermined volume and the motive assembly 14 accomplishes this movement simultaneously along the X, Y and Z axes as well as varying the angular orientation of the object about the X or pitch axis, the Y or roll axis, and the Z or yaw axis. The tracking assembly 16 utilizes at least three tracking laser interferometers for determining the location of the object and for transmitting this information to the control system 18. This system then compares the actual location and angular orientation of the object to the desired location and orientation along the predetermined path and feeds signals back to the motive assembly to move the object to the next desired location and orientation to follow the path. This system also sends signals to tracking mirrors in the tracking assembly so that the laser interferometers maintain their output beams on the object as it moves. By using apparatus 10, control accuracies of 1 part per 250,000 or more can be accomplished.

The object 20 can be a robot arm, a cutting device, a machine tool, a continuously guided vehicle or any other device whose movement is to be controlled through a predetermined non-rectilinear path.

The support assembly 12, for example and as seen in FIGS. 1 and 2, comprises four vertical legs 22–25 supporting a horizontal rectangular frame 26, the frame having two parallel gear tracks 27 and 28 thereon extending longitudinally of the Y axis. This combination of the four legs and the frame essentially defines a predetermined volume having X, Y and Z axes and can include, for example, a height of 10 feet, a width of 10 feet and a depth of 20 feet.

A transverse platform 30, forming part of the support assembly, extends between and rides on the opposite sides of the frame 26 and has four geared wheels, only wheels 31 and 32 being shown, that engage respectively tracks 27 and 28. As seen in FIG. 2, two bidirectional, direct current motors 34 and 35 are carried by the platform and are suitably connected to wheels 31 and 32 to move the platform longitudinally of the frame. These motors are interconnected with the control system 18 via lines 36 and 37 and move the platform along the Y axis. On the top of the platform are a pair of spaced transversely extending gear tracks 39 and 40 which have a slot 41 therebetween extending completely through the platform.

A carriage 43, also part of the support assembly, has four geared wheels, only wheels 44 and 45 being shown, which engage tracks 39 and 40 and are connected to a bidirectional, direct current motor 46 coupled to the carriage. This motor is connected via line 47 to the control system. Upon actuation of the motor 46, the carriage will move along the platform and thus transversely of the frame along the X axis.

Extending rigidly and downwardly from the carriage and through the slot is an arm 50 having an extension 52 depending downwardly therefrom. This extension is coupled to the arm in a conventional manner for rotation about the Z axis and for vertical reciprocation along the Z axis via actuation of bidirectional, direct current motor 53 and motor 54, respectively, these motors being interconnected with the control system via lines 55 and 56.

At the end of extension 52 is a clevis 58 rigidly coupled thereto and having a transverse horizontal shaft pivotally coupled thereto and receiving the object 20 thereon. A bidirectional, direct current motor 60 is carried by the extension 52 and is suitably coupled to shaft 59 or the object 20 itself so that upon actuation of the motor, the object 20 will pivot about the horizontal axis of shaft 59 relative to the extension. This motor 60 is interconnected with the control system via line 61.

Thus, the motive assembly 14 is basically comprised of motors 34, 35, 46, 53, 54 and 60. Upon actuation, motors 34 and 35 move the platform and thus the object 20 coupled thereto longitudinally of the frame and thus along the Y axis and motor 46 moves the carriage 43 and thus the object 20 coupled thereto transversely of the frame along the Z axis. Upon actuation, motor 54 vertically reciprocates extension 52 and thus the object 20 coupled thereto along the vertical Z axis. Upon actuation, motor 60 can vary the angular orientation of the object about the X or Y axes and thus varies the orientation of the object about the pitch and roll axes, depending upon the rotational position of the object about the Z axis, which is controlled by actuation of motor 53. By actuating motor 53, orientation of the object about the yaw axis can be varied. Thus, the six kinematic movements of the object 20 along the X, Y and Z axes and about X, Y and Z axes can be controlled and varied via the motors comprising the motive assembly 14.

Figure 3:
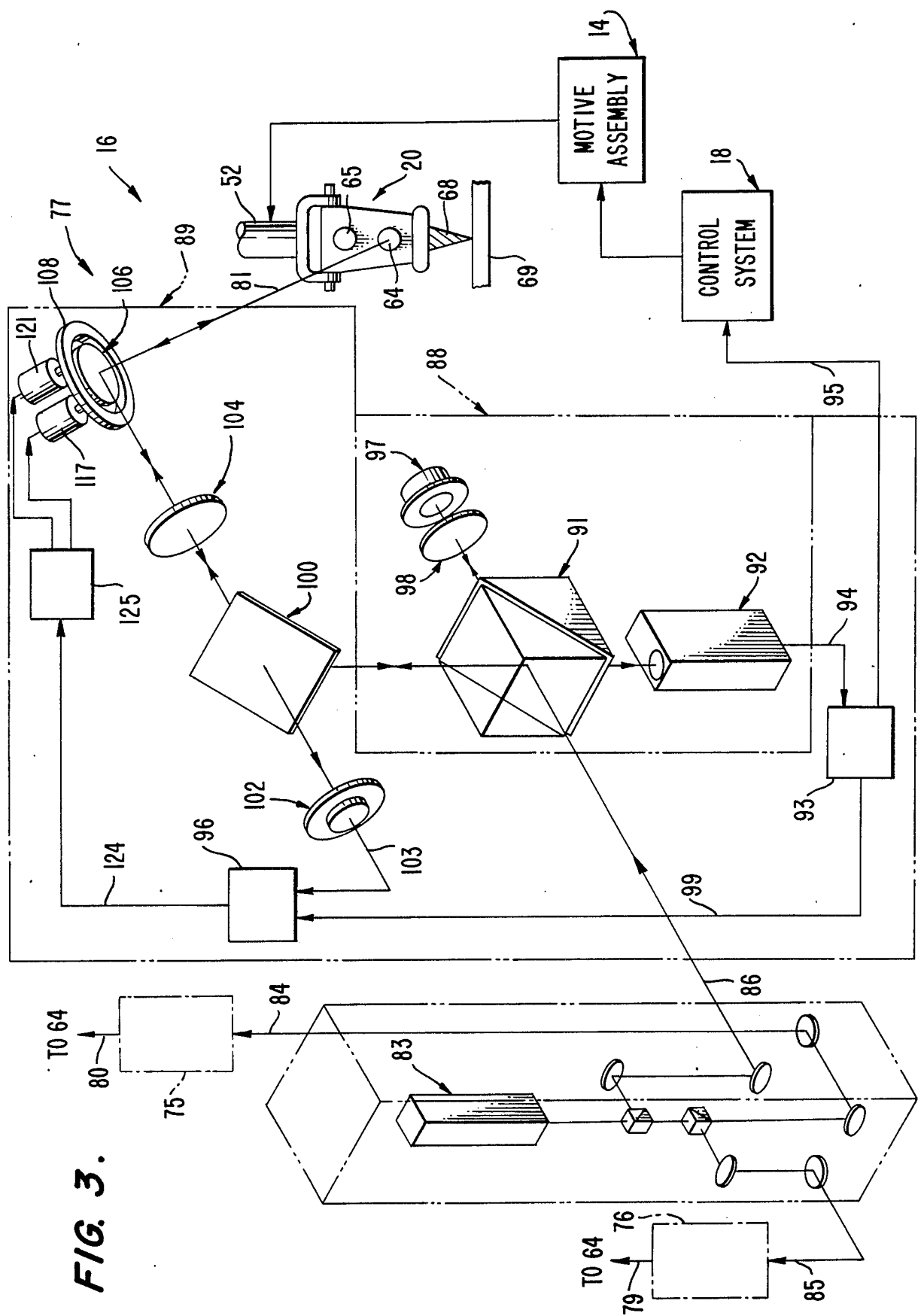
FIG. 3 is a diagrammatic optical schematic of the tracking assembly used in the present invention showing one of the tracking interferometers utilized therein.

The object 20 as seen in FIGS. 1, 2 and 3, can be the end of a robot arm or a cutting device and in all events is rigid and has rigidly coupled thereto a first retroreflector 64 and a second retroreflector 65, these retroreflectors being fixedly spaced apart in the vertical direction by a known distance and lying in the same vertical plane. Advantageously, these retroreflectors are of the cat's eye type. While shown vertically spaced, the two retroreflectors can alternatively be horizontally spaced. If they are horizontally spaced, the tracking assembly, as will be described in more detail hereinafter, can determine the angular orientation of the object about the Z axis. If they are vertically spaced as seen in FIG. 1, the tracking assembly can determine the angular orientation of the object about the X axis.

As illustrated in FIGS. 1 and 2, the object 20 is a laser cutting device having a cutting beam 68 directed at a workpiece 69 that is suitably rigidly coupled to, for example, a factory floor 70 which in turn provides a foundation for the support assembly 12 and the bottom of the predetermined volume. As illustrated in FIG. 1, a curvilinear, predetermined path 71 is being followed by the object and the cutting beam 68, the spacial coordinates of the predetermined path having been precalculated and stored in the control system 18. Although the predetermined path 71 illustrated in FIG. 1 extends only through two dimensions, it is clear that a third dimension can be added as well as control of angular orientation, as will be described in detail hereinafter.

The tracking assembly 16 is shown generally in FIGS. 1 and 2 and in detail in FIG. 3.

As seen in FIGS. 1 and 2, a rigid housing 73 is provided for rigidly connecting together and supporting first, second and third tracking laser interferometers 75, 76 and 77. This housing is rigidly coupled to a base 78 which is in turn rigidly coupled to the floor 70 in a position that is fixed relative to the predetermined volume contained in the support assembly. The three tracking laser interferometers 75-77 have their laser measurement or output beams 79, 80 and 81 directed at the retroreflector 64 on the object and can be used to determine the location, i.e., the spacial coordinates, of the object in the volume via triangulation calculations known in the art and as will be described in more detail hereinafter. A second set of three tracking laser interferometers 75', 76' and 77' can also be rigidly supported via housing 73 and have their laser output beams 79', 80' and 81' directed at the second retroreflector 65 on the object to track and determine the location of the second retroreflector. By comparing the locations of the first and second retroreflectors and using conventional mathematics, the angular orientation of the retroreflectors relative to one another, and thus the angular orientation of the object, can be determined via the control system. Alternatively, one of the second set of tracking laser interferometers can be eliminated and more complicated mathematics can be utilized to determine the angular orientation of the object, based on the specifically known location of the other retroreflector and the distance between the retroreflectors.

The three tracking laser interferometers 75-77 are the same and are, for example, provided with incoming laser beams via a laser 83 seen in FIG. 3 having suitable beam splitters and reflectors to create the three laser input beams in the same plane. These input beams comprise beams 84, 85 and 86 as seen in FIG. 3. Beam 84 is used in association with tracking interferometer 75, beam 85 is used with tracking interferometer 76 and beam 86 is used with tracking interferometer 77, which is shown in detail in FIG. 3.

Tracking interferometer 77, as well as the other two tracking interferometers, is basically formed from an interferometer 88 and a tracking assembly 89.

Interferometer 88 comprises a cube beam splitter 91, a fringe counter 92, and counter electronics 93 which is interconnected with the fringe counter via line 94 and generates an output signal along line 95 to the control system 18 and along line 99 to servo control electronics 96 representing the distance of the object from the interferometer. All of these features are conventional. The interferometer 88 also comprises a conventional reference retroreflector 97 and a conventional polarization isolator 98 located between the reference retroreflector and beam splitter 91.

The tracking assembly 89 comprises a flat beam splitter 100 and a position sensitive photodetector 102 which is connected via line 103 to the servo control electronics 96. The position sensitive photodetector is advantageously a quadrant detector consisting of four photodiodes, or it may be a lateral photodiode which develops an electrical current or a voltage proportional to the displacement of light from the center of the photodetector. Alternatively, the photodetector can be any other device which provides an electrical signal indicative of the two dimensional position of a light beam.

The tracking assembly 89 further comprises a second polarization isolator 104 adjacent the beam splitter 100 and a tracking mirror 106 which is pivotally supported on housing 73 of the tracking assembly about two perpendicular axes.

Figure 5:
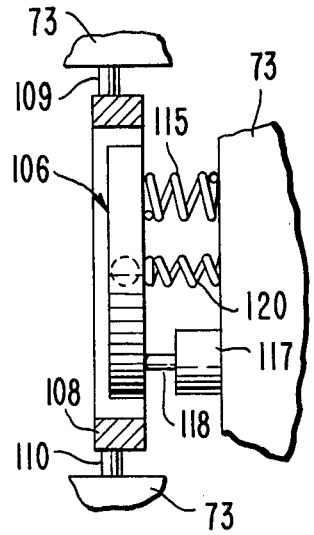
FIG. 5 is a right side elevational view in section taken along line 5—5 in FIG. 4 showing one of the piezoelectric actuators used to control movement of the tracking mirror about one of the gimbal axes.

As seen in FIGS. 3-6, the tracking mirror 106 is planar and is pivotally coupled to an outer ring 108 via two shafts 109 and 110, the ring being in turn pivotally coupled to the housing 73 via shafts 112 and 113. Shafts 109 and 110 are coaxial and are perpendicular to shafts 112 and 113, which are also coaxial. Thus, a two-axis gimbal supports tracking mirror 106 to the housing for pivotal movement about these two axes. As seen in FIG. 5, a spring 115 is supported on the housing 73 and engages the rear of tracking mirror 106 to maintain it in a null position, this position being varied as required via a piezoelectric actuator 117 which is rigidly coupled to the housing and has an actuating rod 118 engaging the rear surface of mirror 106. A similar spring 120, piezoelectric actuator 121 and actuating rod 122 are used for adjusting the position of the ring 108 about shafts 112 and 113. Advantageously, the piezoelectric actuators can adjust the tracking mirrors through two inches with an accuracy of about 1 micron.

As seen in FIG. 3, the servo control electronics 96 is connected via line 124 to a conventional driver control 125 which is in turn connected to actuators 117 and 121. Electronics 96 generate a series of pulses resulting from a comparison of allowable and actual beam displacement from photodetector 102 and the distance measurement of the object from counter electronics 93. These pulses are switched on or off according to whether the beam is inside or outside an allowable displacement error and according to the distance of the object. These pulses are sent to the mirror driver control and energize the actuators 117 and 121 by the necessary amount to move the mirror in the desired direction and speed.

The purpose of the piezoelectric actuators 117 and 121 is to maintain the laser output beam 81 in the center of the retroreflector 64 on the object as it moves and thus are energized to adjust the tracking mirror accordingly. Instead of piezoelectric actuators, stepper motors and speed reducers can be used to rotate the tracking mirror.

As seen by referring to FIG. 3 in detail, the tracking interferometer 77 works as follows. The laser input beam 86 from laser 83 is directed towards the cube beam splitter 91 and a portion of that beam is directed towards flat beam splitter 100. Another portion passes through the polarization isolator 98, strikes retroreflector 97, is reflected back to beam splitter 91 and from there reflected to the fringe counter 92.

From the flat beam splitter 110, the beam is reflected through the second polarization isolator 104, strikes tracking mirror 106 and is reflected onto the retroreflector 64 on the object 20. From retroreflector 64, the beam is reflected back to the tracking mirror 106, through the second polarization isolator 104 and is split via beam splitter 100. A portion of that beam travels back through the cube beam splitter 91 and into the fringe counter 92. Then, the counter electronics 93 generates a signal relating to the distance of the retroreflector 64 from the interferometer 88 and supplies the output signal to the control system. By using similar outputs from the other two interferometers 75 and 76, the control system can calculate the location of the object 20. The control system then compares this location with the desired location of the object along the predetermined path, which is stored therein, and actuates the motive assembly 14 as necessary to move the object to that next desired location.

Meanwhile, the other portion of the beam from the flat beam splitter 100 strikes the position sensitive photodetector 102 which in turn generates a signal representing the deviation of the beam from a central position, this deviation being caused by movement of the object.

The deviation signal from the photodetector 102 is then sent along line 103 to the servo control electronics 96 which also receives the output signal from the counter electronics 93 via line 96 and provides an output signal via line 124 to the mirror control 125, which in turn drives the piezoelectric actuators 117 and 121 to vary the orientation of the tracking mirror 106 so that the laser output beam 81 is incident on the center of retroreflector 64.

EMBODIMENT OF FIG. 7

As seen in FIG. 7, a modified control apparatus is shown which utilizes six tracking laser interferometers 127–132 and three retroreflectors 134–136 rigidly coupled to the object 20' in a triangular array of known configuration and orientation. These tracking interferometers are rigidly coupled in a housing 73' similar to that described above and utilize substantially the same support assembly and motive assembly as discussed above, and like reference numerals are utilized as necessary with the addition of a prime.

In the configuration shown in FIG. 7, the movement of the object 20' can be controlled simultaneously along the X, Y and Z axes by directing three of the tracking interferometer's output beams onto one of the retroreflectors. Then, two other output beams from two other tracking interferometers can be directed towards the second retroreflector and the sixth tracking interferometer can have its output beam directed towards the third retroreflector. By utilizing conventional mathematics in the control system 18', the angular orientation of the object can then be calculated, using the output signals from these six interferometers, along the pitch, roll and yaw axes in the predetermined volume. This is accomplished by directing the fourth and fifth output beams at the second retroreflector and using their measured distances with the known distance between the first and second retroreflectors to obtain the three spatial coordinates of the second retroreflector. In addition, the sixth output beam is directed at the third retroreflector and the measured distance combined with the known geometry of the three retroreflectors to obtain the spatial coordinates of the third retroreflector.

The control apparatus 10 described above need not be perfectly aligned with any specific part of the predetermined volume since the apparatus can be self-calibrated. This is accomplished by moving the object to a location controlled either by mechanical position sensitive devices such as stops or by encoders mounted on the object motive assembly. The location is established in relationship to the interferometer housing so that the spacial coordinates of the retroreflectors mounted on the object are known within a defined error. The control system then computes the required movements of the tracking mirror actuators in order to place the laser output beams in close proximity to their respective retroreflectors. A raster scan pattern is then traced out by the laser beams as a result of the function of the control system. This raster scan ceases when the retroreflectors are acquired by their respective laser beams. In the event that the coarse positioning system utilizing encoders or mechanical stops is accurate enough, a raster scan pattern may not be required to establish the laser beam incident on the retroreflectors.

Once the laser beams have acquired their respective retroreflectors, servo control of the laser beams begins and the object is moved away from the acquisition point.

A sequence now begins in which the object is moved by the control system in a straight line at constant speed either in an open loop fashion or utilizing encoders which provide coarse location information for closed loop control of position. From the coarse, straight line path information and the simultaneous measurements of position as a function of time obtained by the interferometers, the control system uses a least-squares algorithm to compute the absolute distance between each of the tracking mirrors and the target retroreflector, and uses this information to obtain the lengths of the paths between the tracking mirrors and the target retroreflectors when the object was positioned at the acquisition point. This calculated value is used throughout the operation of the system as an offset number, and makes it unnecessary to fit the path to an expected curve during operation.

Once the calibration offset values are obtained, the target object is moved along two additional straight line paths, controlled either open loop or closed loop through the use of coarse encoders, which lie at right angles to the first calibration path. The measured paths are then fitted to straight lines by a least-squares technique, and the resulting orientation of the lines is used to determine the location of the interferometers with respect to the working predetermined volume. This orientation information is used throughout the operation of the apparatus in order to provide coordinate data within the frame of reference of the object, and removes the requirement that the interferometer apparatus be precisely located within the working volume or that the location of the interferometer apparatus be precisely measured as periodic intervals. Thus, the control apparatus 10 including the interferometers, motive assembly and target object are self-calibrating.

While various advantageous embodiments have been chosen to illustrate the invention, it will be understood by those skilled in the art that various changes and modifications can be made therein without departing from the scope of the invention as defined in the appended claims. For example, a second set of retroreflectors can be placed on the opposite side of the target object from the first set and a second series of tracking interferometers can be placed on the opposite side of the object to assure no loss of control of the object during its movement along the predetermined path.

What is claimed is:

1. An apparatus for controlling the movement of an object through a predetermined non-rectilinear path in a predetermined volume having X, Y and Z axes, the combination comprising:

a support;

a first means, coupled to said support and the object, for moving the object simultaneously along the X, Y and Z axes;

a retroreflector rigidly coupled to the object;

a housing rigidly coupled to the support and in a fixed position relative to the predetermined volume;

first, second and third laser interferometers rigidly coupled to said housing, and having first, second and third laser output beams, and first, second and third output signals;

first, second and third tracking mirrors, each associated with one of said laser interferometers for directing the associated laser output beam incident on the center of said retroreflector;

second means for pivotally coupling each of said tracking mirrors to said housing for pivotal movement about two perpendicular axes;

motive means, coupled to each of said tracking mirrors and said housing, for moving each tracking mirror to maintain each of said output beams incident on the center of said retroreflector; and control means, containing the X, Y and Z spacial coordinates of the predetermined path, coupled to said first means and said motive means and receiving said interferometer output signals, for (a) repeatedly determining the actual location of the object based on said interferometer output signals, (b) repeatedly comparing the actual location with the desired location along the predetermined path, (c) actuating said first means to move the object from its actual location to the next desired location along the predetermined path, and (d) actuating said motive means to pivot said tracking mirrors to maintain said laser output beams incident on the center of said retroreflector.

2. An apparatus according to claim 1, and further comprising a second retroreflector rigidly coupled to the object a fixed and known distance from said retroreflector and vertically spaced therefrom, fourth and fifth laser interferometers rigidly coupled to said housing and having fourth and fifth laser output beams, and fourth and fifth output signals, fourth and fifth tracking mirrors, each associated with one of said fourth and fifth laser interferometers for directing the associated fourth and fifth laser output beams incident on the center of said second retroreflector, third means for pivotally coupling each of said fourth and fifth tracking mirrors to said housing for pivotal movement about two perpendicular axes;

said motive means being coupled to each of said fourth and fifth tracking mirrors and said housing for moving said fourth and fifth tracking mirrors to maintain each of said fourth and fifth output beams incident on the center of said second retroreflector, said first means including means for varying the angular orientation of the object about a horizontal axis parallel to the X axis, said control means containing the desired angular orientation coordinates of the object about the X axis along the predetermined path, the distance between said reflector and second reflector, and receiving said fourth and fifth output signals, for (a) repeatedly determining the actual angular orientation of the object about the X axis based on said fourth and fifth output signals, (b) repeatedly comparing the actual angular orientation about the X axis with the desired angular orientation along the predetermined path, (c) actuating said means for varying the angular orientation of the object to move the object from its actual orientation to the next desired orientation along the predetermined path, and (d) actuating said motive means to pivot said fourth and fifth tracking mirrors to maintain said fourth and fifth laser output beams incident on the center of said second retroreflector.

3. An apparatus according to claim 2, and further comprising a third retroreflector rigidly coupled to the object at fixed and known distances from said retroreflector and second retroreflector and spaced from a line intersecting said retroreflector and second retroreflector, a sixth laser interferometer rigidly coupled to said housing and having a sixth laser output beam and a sixth output signal, a sixth tracking mirror associated with said sixth laser interferometer for directing the associated sixth laser output beam incident on the center of said third retroreflector, fourth means for pivotally coupling said sixth tracking mirror to said housing for pivotal movement about two perpendicular axes, said motive means being coupled to said sixth tracking mirror and said housing for moving said sixth tracking mirror to maintain said sixth output beam incident on the center of said third retroreflector, said first means including means for varying the angular orientation of the object about a horizontal axis parallel to the Y axis and about a vertical axis parallel to the Z axis, said control means containing the desired angular orientation coordinates of the object about the Y and Z axes along the predetermined path, the distances between said third retroreflector and said reflector and second reflector, and receiving said sixth output signal, for (a) repeatedly determining the actual angular orientation of the object about the Y and Z axes based on said fourth, fifth and sixth output signals, (b) repeatedly comparing the actual angular orientation about the Y and Z axes with the desired angular orientation along the predetermined path, (c) actuating said means for varying the angular orientation of the object about the Y and Z axes to move the object from its actual orientation to the next desired orientation along the predetermined path, and (d) actuating said motive means to pivot said sixth tracking mirror to maintain said sixth laser output beam incident on the center of said third retroreflector.

4. An apparatus according to claim 1, and further comprising
a second retroreflector rigidly coupled to the object a fixed and known distance from said retroreflector and spaced therefrom,
fourth and fifth laser interferometers rigidly coupled to said housing and having fourth and fifth laser output beams, and fourth and fifth output signals,
fourth and fifth tracking mirrors, each associated with one of said fourth and fifth laser interferometers for directing the associated fourth and fifth laser output beams incident on the center of said second retroreflector,
third means for pivotally coupling each of said fourth and fifth tracking mirrors to said housing for pivotal movement about two perpendicular axes;
said motive means being coupled to each of said fourth and fifth tracking mirrors and said housing for moving said fourth and fifth tracking mirrors to maintain each of said fourth and fifth output beams incident on the center of said second retroreflector,
said first means including means for varying the angular orientation of the object about a horizontal axis parallel to one of the X and Y axes,
said control means containing the desired angular orientation coordinates of the object about one of the X and Y axes along the predetermined path, the distance between said reflector and second reflector, and receiving said fourth and fifth output signals, for
(a) repeatedly determining the actual angular orientation of the object about the horizontal axis based on said fourth and fifth output signals,
(b) repeatedly comparing the actual angular orientation with the desired angular orientation along the predetermined path,
(c) actuating said means for varying the angular orientation of the object to move the object from its actual orientation to the next desired orientation along the predetermined path, and
(d) actuating said motive means to pivot said fourth and fifth tracking mirrors to maintain said fourth and fifth laser output beams incident on the center of said second retroreflector.

5. An apparatus according to claim 1, wherein said motive means comprises a piezoelectric actuator.

6. An apparatus according to claim 1, wherein said control means comprises a laser beam position sensitive photodetector means for detecting the displacement of the laser beam from the center of said retroreflector.

7. An apparatus according to claim 6, wherein said photodetector means comprises a quadrant detector.

8. A method for controlling the movement of an object through a predetermined non-rectilinear path in a predetermined volume having X, Y and Z axes, comprising the steps of
storing the predetermined X, Y and Z spacial coordinates of the predetermined path,
positioning the object in the predetermined volume with a retroreflector rigidly coupled thereto,
directing three laser beams incident on the center of the retroreflector from three laser interferometers rigidly positioned relative to one another and to the predetermined volume,
generating an output signal from the laser interferometers representing the actual location of the retroreflector and object,
comparing the actual location of the retroreflector and object with the desired location along the predetermined path,
moving the object from its actual location to the next desired location along the predetermined path,
redirecting the three laser beams incident on the center of the retroreflector, and
continuously repeating the generating, comparing, moving and redirecting steps until the object has traversed the entire predetermined path.

9. A method according to claim 8, and further comprising the steps of
storing predetermined angular orientation coordinates of the object about a horizontal axis parallel to the X axis,
rigidly coupling a second retroreflector a known distance from the retroreflector and vertically spaced therefrom,
directing fourth and fifth laser beams incident on the center of the second retroreflector from fourth and fifth laser interferometers rigidly positioned relative to one another, the first three interferometers and the predetermined volume,
generating a second output signal from the outputs of the fourth and fifth laser interferometers, the distance between the retroreflector and the second retroreflector, and the output signal from the first three laser interferometers representing the actual angular orientation of the object about the horizontal axis,
comparing the actual angular orientation of the object with the desired angular orientation along the predetermined path,
varying the angular orientation of the object from its actual orientation to the next desired orientation along the predetermined path,
redirecting the fourth and fifth laser beams incident on the center of the retroreflector, and
continuously repeating the generating, comparing, varying and redirecting steps until the object has traversed the entire predetermined path.

10. A method according to claim 9, and further comprising the steps of
storing predetermined angular orientation coordinates of the object about a horizontal axis parallel to the Y axis and a vertical axis parallel to the Z axis,
rigidly coupling a third retroreflector at known distances from the retroreflector and second retroreflector and spaced from a line intersecting the retroreflector and second retroreflector,
directing a sixth laser beam incident on the center of the third retroreflector from a sixth laser interferometer rigidly positioned relative to the other five interferometers and the predetermined volume,
generating third and fourth output signals from the output of the sixth laser interferometer, the second output signal from the outputs of the fourth and fifth laser interferometers, the distances between the third retroreflector and the retroreflector and second retroreflector, and the output signal from the first three laser interferometers representing the actual angular orientation of the object about the Y and Z axes, comparing the actual angular orientations of the object about the Y and Z axes with the desired angular orientation along the predetermined path, varying the angular orientations of the object from its actual orientations to the next desired orientations along the predetermined path, redirecting the sixth laser beam incident on the center of the third retroreflector, and continuously repeating the generating, comparing, varying and redirecting steps until the object has traversed the entire predetermined path.

11. A method according to claim 7, and further comprising the steps of storing predetermined angular orientation coordinates of the object about a horizontal axis parallel to one of the X and Y axes, rigidly coupling a second retroreflector a known distance from the retroreflector and spaced therefrom, directing fourth and fifth laser beams incident on the center of the second retroreflector from fourth and fifth laser interferometers rigidly positioned relative to one another, the first three interferometers and the predetermined volume, generating a second output signal from the outputs of the fourth and fifth laser interferometers, the distance between the retroreflector and the second retroreflector, and the output signal from the first three laser interferometers representing the actual angular orientation of the object about one of the X and Y axes, comparing the actual angular orientation of the object with the desired angular orientation along the predetermined path, varying the angular orientation of the object from its actual orientation to the next desired orientation along the predetermined path, redirecting the fourth and fifth laser beams incident on the center of the retroreflector, and continuously repeating the generating, comparing, varying and redirecting steps until the object has traversed the entire predetermined path.

* * * * *